(12) United States Patent
Yang (10) Patent No.: US 9,261,168 B2
(45) Date of Patent: Feb. 16, 2016

(54) DUAL CONDIMENT GRINDER

(71) Applicant: Heng-De Yang, Tainan (TW)

(72) Inventor: Heng-De Yang, Tainan (TW)

(*) Notice: Subject to any disclaimer, the term of this patent is extended or adjusted under 35 U.S.C. 154(b) by 428 days.

(21) Appl. No.: 13/917,713

(22) Filed: Jun. 14, 2013

(65) Prior Publication Data
US 2014/0366666 A1 Dec. 18, 2014

(51) Int. Cl.
*A47J 42/46* (2006.01)
*F16H 3/34* (2006.01)
*A47J 42/40* (2006.01)
*A47J 42/50* (2006.01)
*A47J 42/02* (2006.01)

(52) U.S. Cl.
CPC . *F16H 3/34* (2013.01); *A47J 42/40* (2013.01); *A47J 42/46* (2013.01); *A47J 42/50* (2013.01); *A47J 42/02* (2013.01); *Y10T 74/19367* (2015.01)

(58) Field of Classification Search
CPC ............. F16H 3/34; A47J 42/46; A47J 42/40; A47J 42/50; A47J 42/02; Y10T 74/19367
USPC ............................................ 241/101.2, 169.1
See application file for complete search history.

(56) References Cited

U.S. PATENT DOCUMENTS

| 4,709,865 | A | * | 12/1987 | Bounds | A47J 42/04 241/138 |
| 4,844,352 | A | * | 7/1989 | Griffin | A47J 42/46 241/101.2 |
| 5,088,652 | A | * | 2/1992 | Chen | A47J 42/46 241/169.1 |
| 2009/0057451 | A1 | * | 3/2009 | Tang | A47J 42/46 241/146 |
| 2009/0314867 | A1 | * | 12/2009 | Bodum | A47J 42/46 241/169.1 |

* cited by examiner

*Primary Examiner* — Mark Rosenbaum
(74) *Attorney, Agent, or Firm* — Alan D. Kamrath; Kamrath IP Lawfirm, P.A.

(57) ABSTRACT

A dual condiment grinder contains: a body, a transmitting mechanism, a covering assembly, and a grinding mechanism. The body includes a first chamber and a second chamber, the grinding mechanism includes a first transmission column and a second transmission column. The covering assembly includes an inner cover and an outer cover. The body includes a first retaining recess and a second retaining recess. The transmitting mechanism includes a holder, a pressing member, a rotary shaft, a main gear, a left gear, a right gear, a first transmission gear, and a second transmitting gear. The main gear does not mesh with the left gear and the right gear, the first transmission gear does not mesh with the second transmitting gear, and the first transmission gear and the second transmitting gear mesh with the main gear respectively, such that two different ingredients are ground in the first chamber and the second chamber.

2 Claims, 9 Drawing Sheets

FIG. 1

PRIOR ART

FIG. 2

PRIOR ART

DUAL CONDIMENT GRINDER

FIELD OF THE INVENTION

The present invention relates to a dual condiment grinder which is used to store and grind two different ingredients respectively.

BACKGROUND OF THE INVENTION

Figure 1:
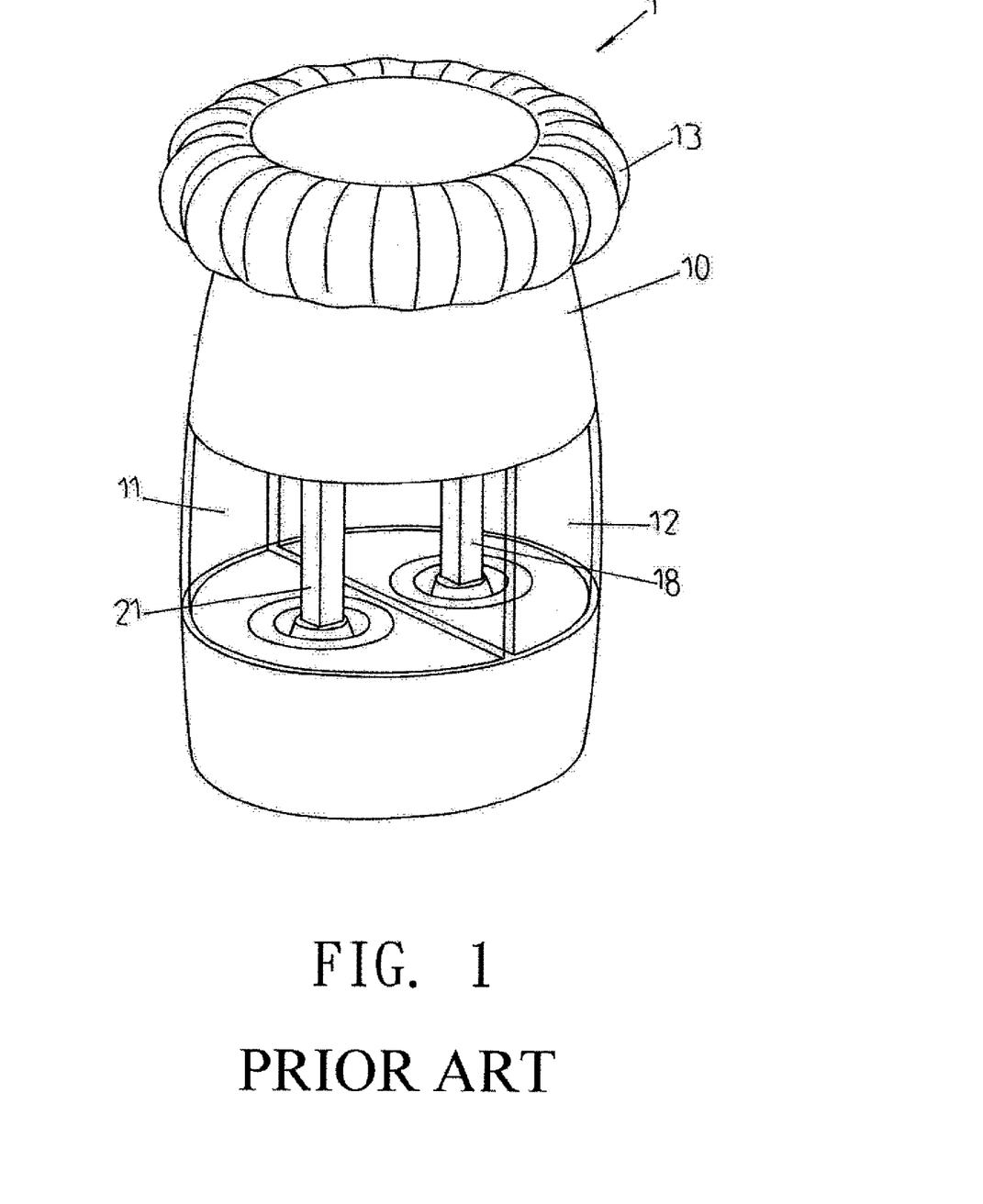
FIG. 1 is a perspective view of a conventional dual condiment grinder.
Figure 2:
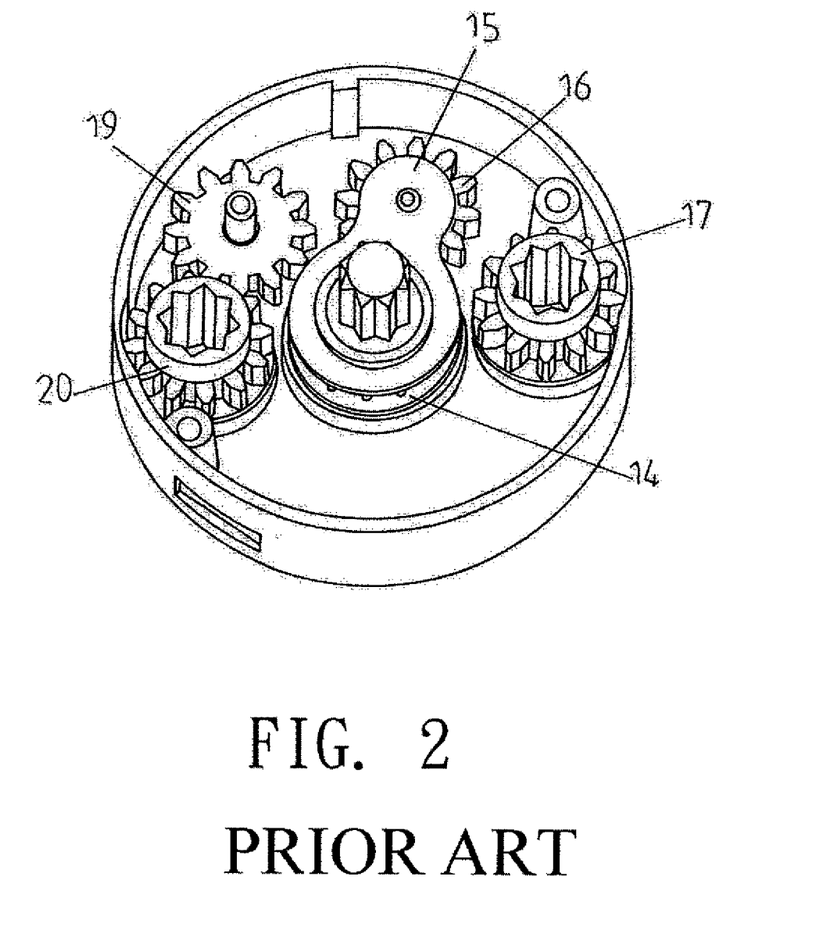
FIG. 2 is a perspective view of a transmitting mechanism of a conventional dual condiment grinder.
Figure 3:
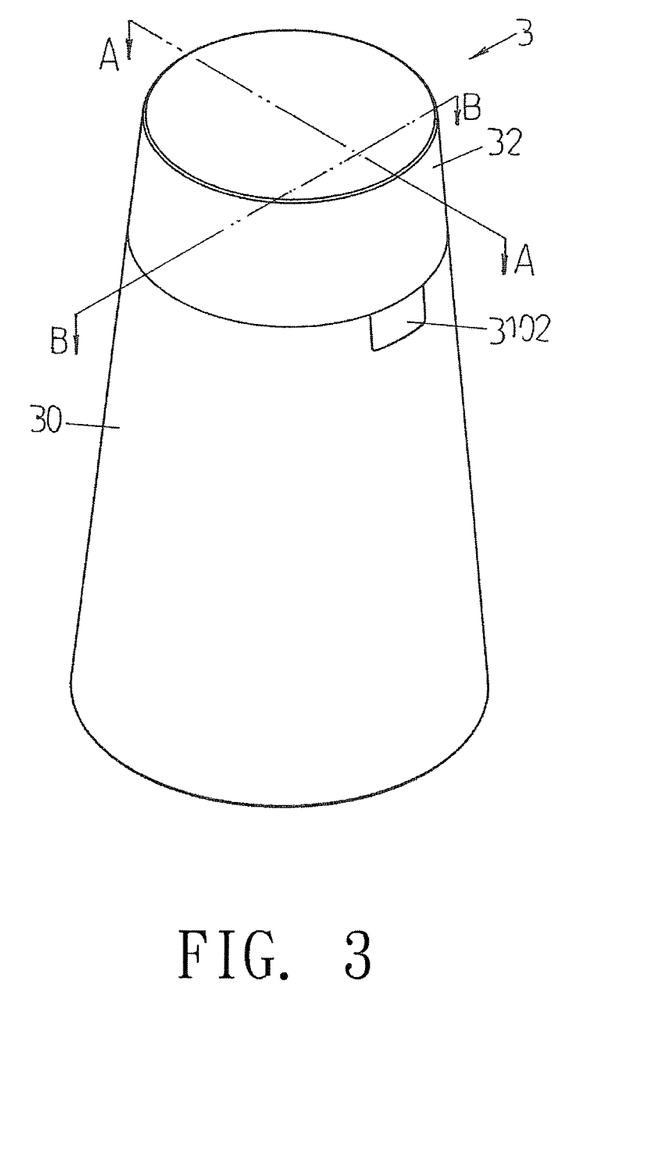
FIG. 3 is a perspective view showing the assembly of a dual condiment grinder according to a preferred embodiment of the present invention.
Figure 4:
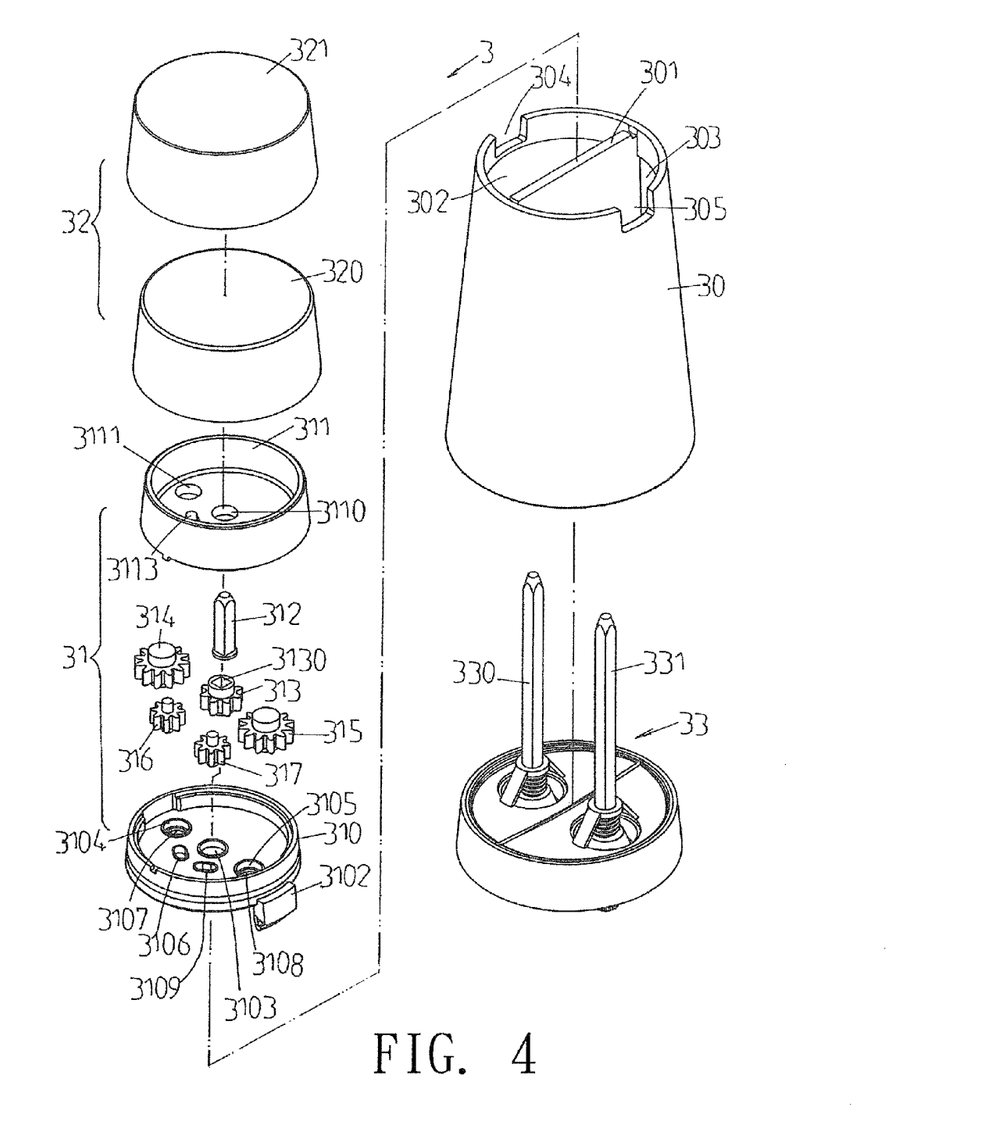
FIG. 4 is a perspective view showing the exploded components of the dual condiment grinder according to the preferred embodiment of the present invention.
Figure 5:
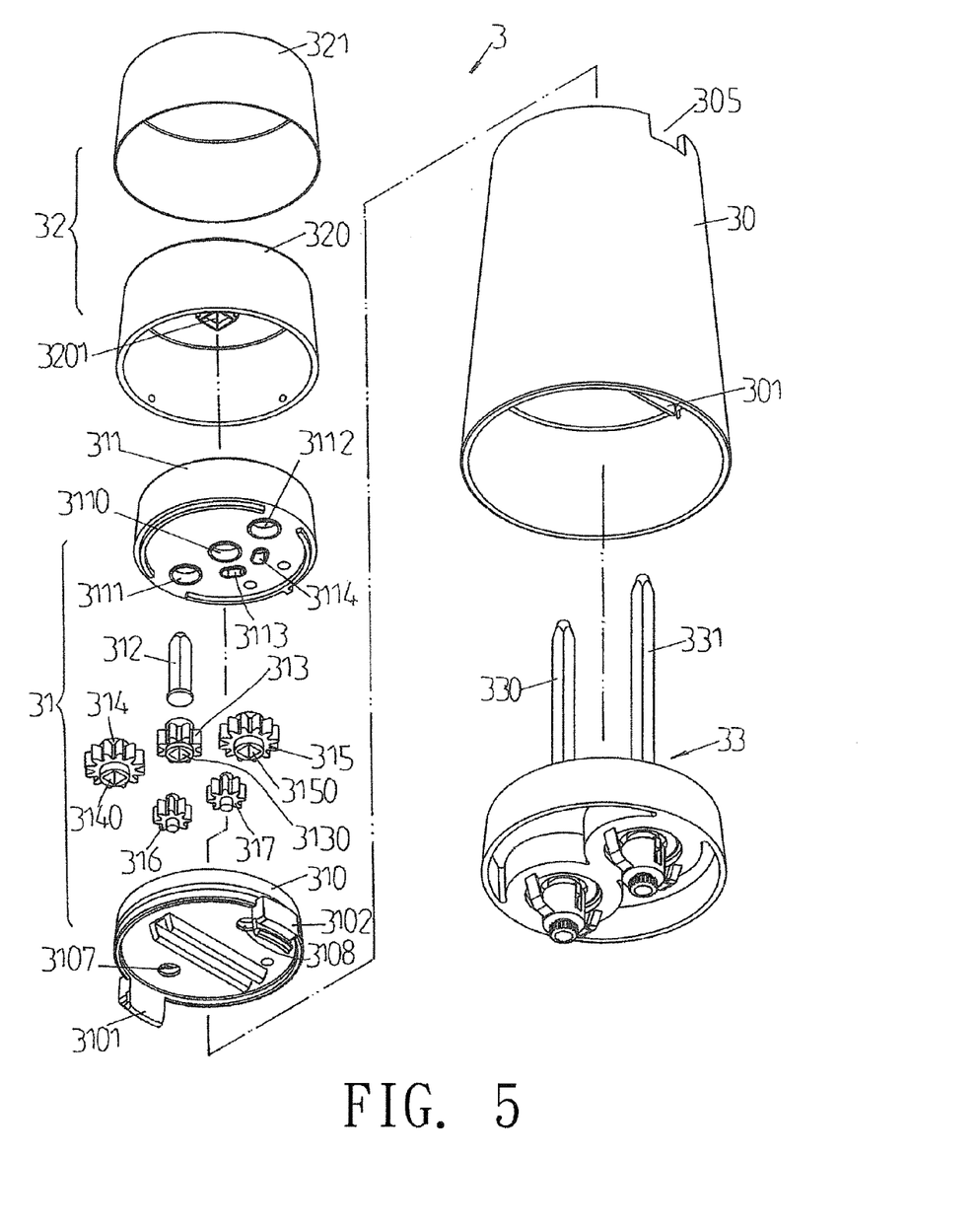
FIG. 5 is another perspective view showing the exploded components of the dual condiment grinder according to the preferred embodiment of the present invention.
Figure 6:
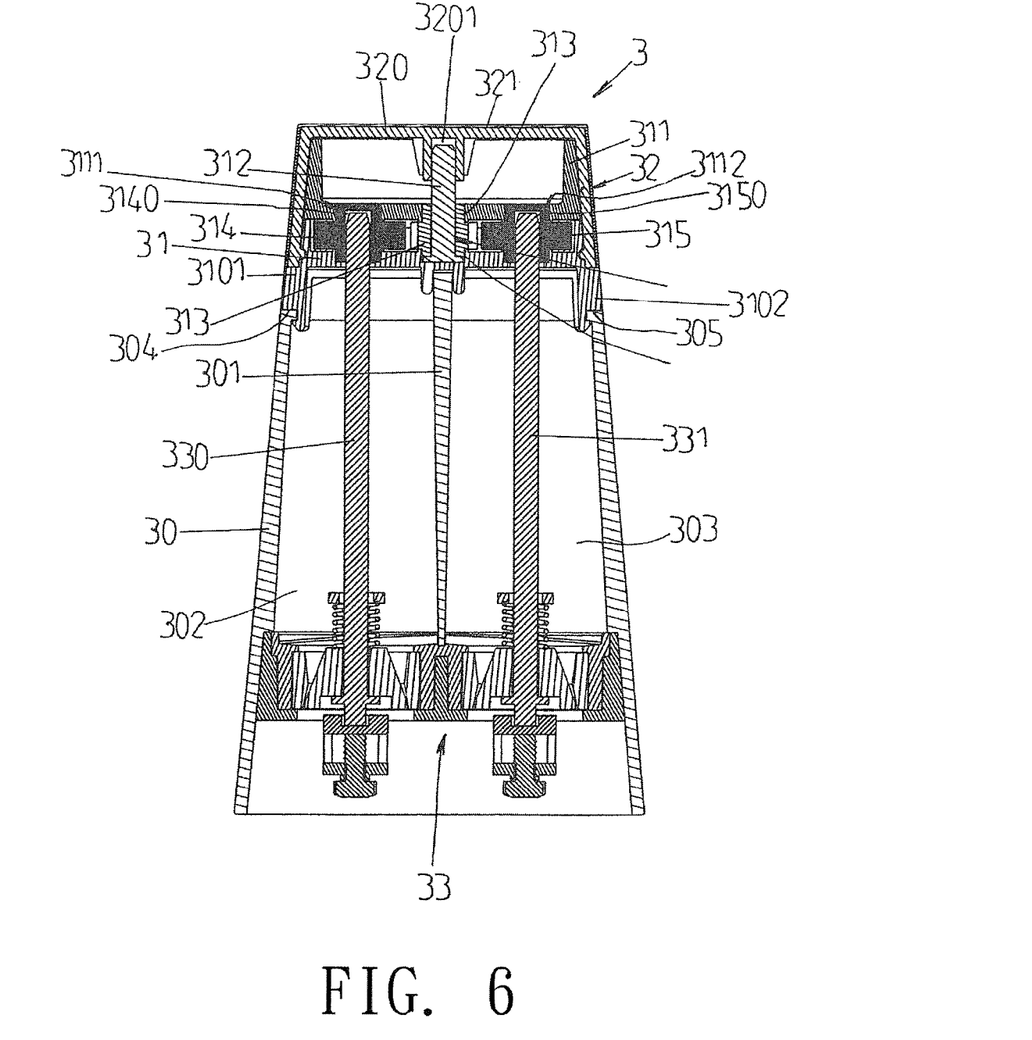
FIG. 6 is a cross sectional view taken along the line A-A of FIG. 3.
Figure 7:
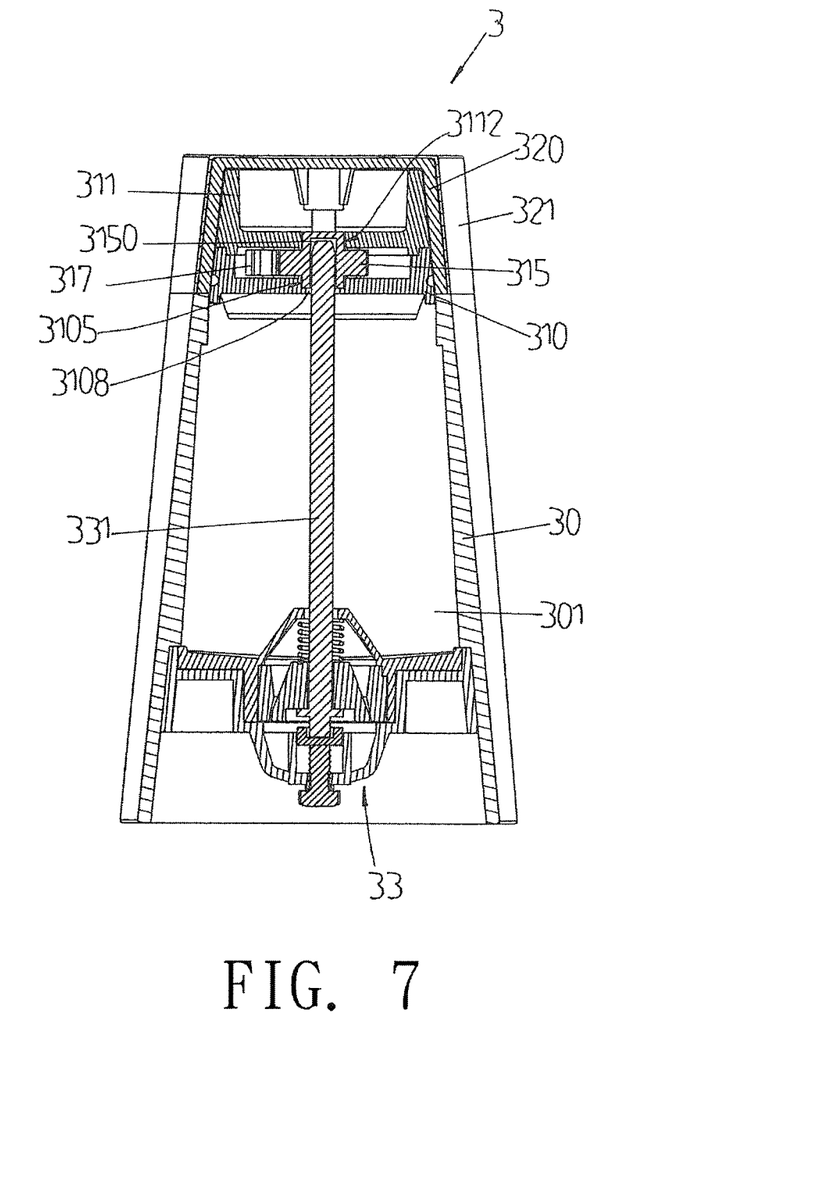
FIG. 7 is a cross sectional view taken along the line B-B of FIG. 3.

Referring to FIGS. 1 and 2, a conventional dual condiment grinder 1 contains a body 10, and the body 10 includes a first chamber 11 and a second chamber 12, a cover 13 is rotated to drive the main gear 14 to rotate, such that a holder 15 which meshes with the main gear 14 is rotated rightward by the main gear 14, and a sub-gear 16 which connects with the holder 15 is rotated rightward by the holder 15 so as to match with a right gear 17. Thereafter, after rotating the cover 13 continuously in a clockwise direction, the sub-gear 16 drives the right gear 17, and then the right gear 17 drives a first grinding post 18 to grind a first ingredient. When rotating the cover 13 in a counterclockwise direction, the main gear 14 is driven by the cover 13 to rotate the holder 15 leftward, and then the sub-gear 16 is driven by the holder 15 to move leftward, such that the sub-gear 16 cooperates with a driven gear 19. When rotating the cover 13 continuously, the sub-gear 16 drives the driven gear 19, and the driven gear 19 actuates a left gear 20 to rotate so that the left gear 20 drives a second grinding post 20 to grind a second ingredient. However, such a transmitting mechanism is complicated and produced at high cost because of complicated parts.

The present invention has arisen to mitigate and/or obviate the afore-described disadvantages.

SUMMARY OF THE INVENTION

The primary object of the present invention is to provide a dual condiment grinder which has a simplified transmitting mechanism and is produced easily at lower cost.

Further object of the present invention is to provide a dual condiment grinder which is operated easily.

Another primary object of the present invention is to provide a dual condiment grinder which is used to store and grind two different ingredients respectively.

To obtain the above objectives, a dual condiment grinder contains a body, a transmitting mechanism, a covering assembly, and a grinding mechanism.

The body includes a first chamber and a second chamber separated from the first chamber, the grinding mechanism is disposed below the body and includes a first transmission column and a second transmission column extending outwardly from a top end thereof and connecting with the transmitting mechanism, and the covering assembly is comprised of an inner cover and an outer cover.

The body includes a first retaining recess defined on a top end of the body adjacent to the first chamber and a second retaining recess defined on the top end of the body proximate to the second chamber and opposite to the first retaining recess.

The transmitting mechanism includes a holder, a pressing member, a rotary shaft, a main gear, a left gear, a right gear, a first transmission gear, and a second transmitting gear, wherein the holder has: a first locking projection mounted on one side of a bottom end thereof and retaining with the first retaining recess, a second locking projection mounted on another side of the bottom end of the holder and retaining with the first retaining recess, a first notch defined on a central portion of a top end of the holder so as to receive the main gear, a second notch and a third notch formed on two sides of the first notch so as to receive the left gear and the right gear, wherein the second notch has a first hole defined on a central portion thereof so as to insert the first transmission column, and the third notch has a second hole defined on a central portion thereof so as to insert the first transmission column.

The pressing member has a first orifice for matching with the first notch, a second orifice for mating with the second notch, a third orifice for cooperating with the third notch.

The holder further has a first tilted cutout formed adjacent to the second notch and a second tilted cutout arranged proximate to the third notch; the pressing member also has a first tilted aperture for matching with the first tilted cutout and a second tilted aperture for mating with the second tilted cutout; the main gear has a square hole defined on a central portion thereof so as to insert the rotary shaft, the left gear has a first square recess formed on a central portion of a bottom end thereof so as to insert the first transmission column, and the right gear has a second square recess formed on a central portion of a bottom end thereof so as to insert the second transmission column, such that two ends of the main gear are inserted into the first notch of the holder and the first orifice of the pressing member, two ends of the left gear are inserted into the second notch of the holder and the second orifice of the pressing member, and the two ends of the right gear are inserted into the third notch of the holder and the third orifice of the pressing member, two ends of the first transmission gear are received in the first tilted cutout of the holder and the first tilted aperture of the pressing member, and two ends of the second transmission gear are received in the second tilted cutout of the holder and the second tilted aperture of the pressing member, hence after the pressing member is connected with the holder, the rotary shaft is inserted into the square hole of the main gear so as to form the transmitting mechanism.

The first transmission column and the second transmission column of the grinding mechanism are inserted into the first square recess of the left gear and the second square recess of the right gear through the first hole and the second hole of the holder, and a top end of the rotary shaft is inserted into the square trench of the inner cover, the inner cover is retained with the holder, and the outer cover is fitted with the inner cover.

DETAILED DESCRIPTION OF THE PREFERRED EMBODIMENTS

With reference to FIGS. 3-7, a dual condiment grinder 3 according to a preferred embodiment of the present invention contains: a body 30, a transmitting mechanism 31, a covering assembly 32, and a grinding mechanism 33. The body 30 includes a separating plate 301 for separating a first chamber 302 and a second chamber 303, a first retaining recess 304 defined on a top end of the body 30 adjacent to the first chamber 302, and a second retaining recess 305 defined on the top end of the body 30 proximate to the second chamber 303 and opposite to the first retaining recess 304. The grinding mechanism 33 is disposed below the body 30 and includes a first transmission column 330 and a second transmission column 331 extending outwardly from a top end thereof and connecting with the transmitting mechanism 31. The transmitting mechanism 31 includes a holder 310, a pressing member 311, a rotary shaft 312, a main gear 313, a left gear 314, a right gear 315, a first transmission gear 316, and a second transmitting gear 317, wherein the holder 310 has: a first locking projection 3101 mounted on one side of a bottom end thereof and retaining with the first retaining recess 304, a second locking projection 3102 mounted on another side of the bottom end of the holder 310 and retaining with the first retaining recess 304, a first notch 3103 defined on a central portion of a top end of the holder 310 so as to receive the main gear 313, a second notch 3104 and a third notch 3105 formed on two sides of the first notch 3010 so as to receive the left gear 314 and the right gear 315, wherein the second notch 3104 has a first hole 3107 defined on a central portion thereof so as to insert the first transmission column 330, and the third notch 3105 has a second hole 3108 defined on a central portion thereof so as to insert the first transmission column 331. The holder 310 further has a first tilted cutout 3106 formed adjacent to the second notch 3104 and a second tilted cutout 3109 arranged proximate to the third notch 3105. The main gear 313 has a square hole 3130 defined on a central portion thereof so as to insert the rotary shaft 312. The left gear 314 has a first square recess 3140 formed on a central portion of a bottom end thereof so as to insert the first transmission column 330, and the right gear 315 has a second square recess 3150 formed on a central portion of a bottom end thereof so as to insert the second transmission column 331. The pressing member 311 has a first orifice 3110 for matching with the first notch 3103, a second orifice 3111 for mating with the second notch 3104, a third orifice 3112 for cooperating with the third notch 3105, a first tilted aperture 3113 for matching with the first tilted cutout 3106, and a second tilted aperture 3114 for mating with the second tilted cutout 3109, such that two ends of the main gear 313 are inserted into the first notch 3103 of the holder 310 and the first orifice 3110 of the pressing member 311, two ends of the left gear 314 are inserted into the second notch 3104 of the holder 310 and the second orifice 3111 of the pressing member 311, and the two ends of the right gear 315 are inserted into the third notch 3105 of the holder 310 and the third orifice 3112 of the pressing member 311, two ends of the first transmission gear 316 are received in the first tilted cutout 3106 of the holder 310 and the first tilted aperture 3113 of the pressing member 311, and two ends of the second transmission gear 316 are received in the second tilted cutout 3109 of the holder 310 and the second tilted aperture 3114 of the pressing member 311, hence after the pressing member 311 is connected with the holder 310, the rotary shaft 312 is inserted into the square hole 3130 of the main gear 313 so as to form the transmitting mechanism 31. The covering assembly 32 is comprised of an inner cover 302 and an outer cover 321, the inner cover 320 has a square trench 3201 defined on a central portion thereof so as to insert the rotary shaft 312, such that the first transmission column 330 and the second transmission column 331 of the grinding mechanism 33 are inserted into the first square recess 3140 of the left gear 314 and the second square recess 3150 of the right gear 315 through the first hole 3107 and the second hole 3108 of the holder 310, and a top end of the rotary shaft 312 is inserted into the square trench 3201 of the inner cover 320, the inner cover 320 is retained with the holder 310, and the outer cover 321 is fitted with the inner cover 320, thus assemble the dual condiment grinder 3. It is to be noted that the main gear 313 does not mesh with the left gear 314 and the right gear 315, the first transmission gear 316 does not mesh with the second transmitting gear 317, but the first transmission gear 316 and the second transmitting gear 317 mesh with the main gear 313 respectively, and the first transmission gear 316 is located at left sides of the first tilted cutout 3106 and the first tilted aperture 3113, the second transmission gear 317 is located at left sides of the second tilted cutout 3109 and the second tilted aperture 3114 so that the main gear 313 drives the left gear 314 via the first transmission gear 316; or the first transmission gear 316 is located at right sides of the first tilted cutout 3106 and the first tilted aperture 3113, the second transmission gear 317 is located at right sides of the second tilted cutout 3109 and the second tilted aperture 3114 so that the main gear 313 drives the right gear 315 via the second transmission gear 317.

Figure 8:
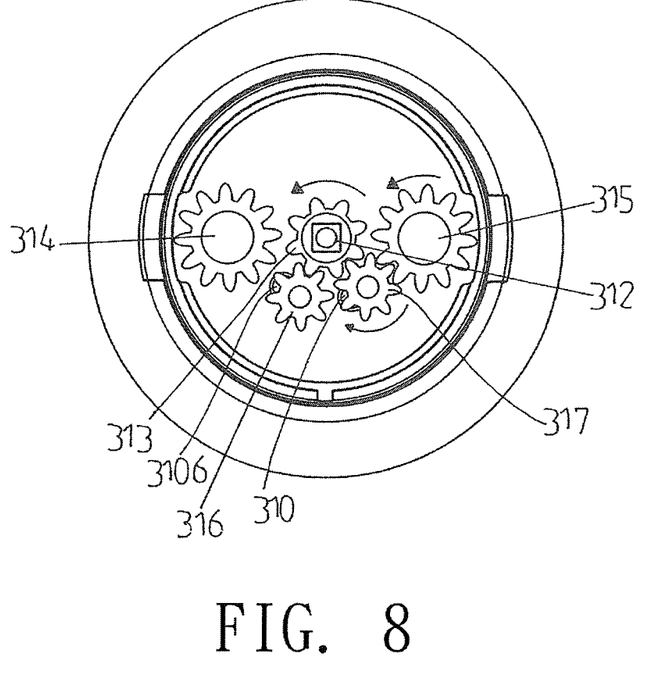
FIG. 8 is a plan view showing the operation of a transmitting mechanism of the dual condiment grinder according to the preferred embodiment of the present invention.
Figure 9:
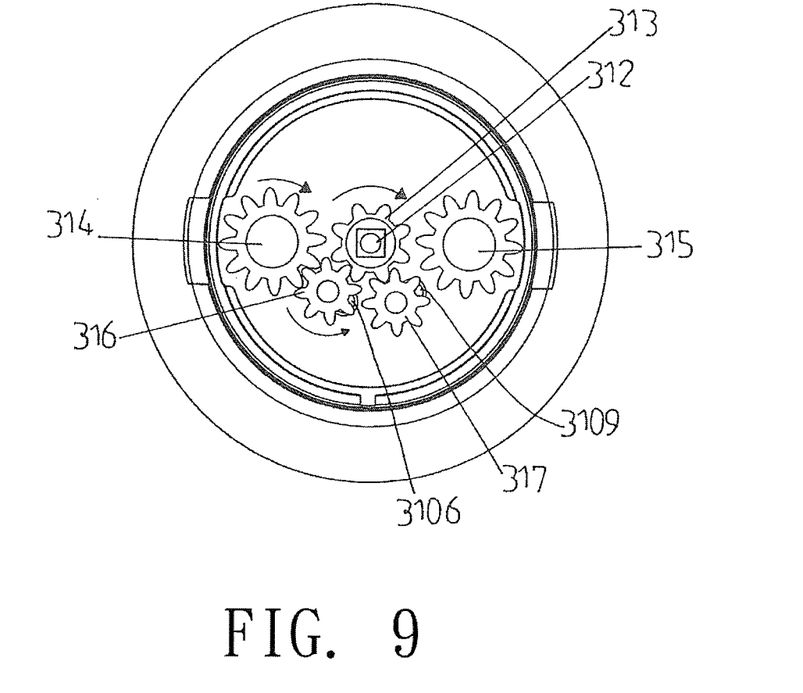
FIG. 9 is another plan view showing the operation of the transmitting mechanism of the dual condiment grinder according to the preferred embodiment of the present invention.

As shown in FIGS. 8 and 9, in operation, when the first transmission gear 316 is located at the right sides of the first tilted cutout 3106 and the first tilted aperture 3113, and the second transmission gear 317 is located at the right sides of the second tilted cutout 3109 and the second tilted aperture 3114, the covering assembly 32 is rotated in a counterclockwise direction so as to drive the rotary shaft 312 and the main gear 313 which meshes with the rotary shaft 312 to rotate, such that the second transmitting gear 317 is driven by the main gear 313 to further drive the right gear 315, and then the right gear 315 drives the second transmission column 331 to rotate, thus grinding a first ingredient in the second chamber 303. When the covering assembly 32 is rotated in a clockwise direction, the main gear 313 is driven to actuate the first transmission gear 316 and the second transmitting gear 317 to move, wherein the first transmission gear 316 moves to the left sides of the first tilted cutout 3106 and the first tilted aperture 3113, and the second transmission gear 317 moves to the left sides of the second tilted cutout 3109 and the second tilted aperture 3114 so as to rotate the covering assembly 32 clockwisely, such that the rotary shaft 312 and the main gear 313 are driven to rotate, and then the first transmission gear 316 is driven by the main gear 313 to actuate the left gear 314 to rotate so that the first transmission column 330 is driven to rotate by the left gear 314, thus grinding another second ingredient in the first chamber 302. While desiring to grind a third ingredient in the second chamber 303 once more, the covering assembly 32 is rotated in the counterclockwise direction so that the first transmission gear 316 moves to the right sides of the first tilted cutout 3106 and the first tilted aperture 3113, and the second transmitting gear 317 moves to the right sides of the second tilted cutout 3109 and the second tilted aperture 3114, thereafter the covering assembly 32 is rotated in the counterclockwise direction continuously.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A dual condiment grinder comprising: a body, a transmitting mechanism, a covering assembly, and a grinding mechanism;

the body including a first chamber and a second chamber separated from the first chamber, the grinding mechanism disposed below the body and including a first transmission column and a second transmission column extending outwardly from a top end thereof and connecting with the transmitting mechanism, and the covering assembly being comprised of an inner cover and an outer cover, characterized in that the body includes a first retaining recess defined on a top end of the body adjacent to the first chamber and includes a second retaining recess defined on the top end of the body proximate to the second chamber and opposite to the first retaining recess;

the transmitting mechanism includes a holder, a pressing member, a rotary shaft, a main gear, a left gear, a right gear, a first transmission gear, and a second transmission gear, wherein the holder has: a first locking projection mounted on one side of a bottom end thereof and retaining with the first retaining recess, a second locking projection mounted on another side of the bottom end of the holder and retaining with the first retaining recess, a first notch defined on a central portion of a top end of the holder so as to receive the main gear, a second notch and a third notch formed on two sides of the first notch so as to receive the left gear and the right gear, wherein the second notch has a first hole defined on a central portion thereof so as to insert the first transmission column, and the third notch has a second hole defined on a central portion thereof so as to insert the first transmission column; the pressing member has a first orifice for matching with the first notch, a second orifice for mating with the second notch, a third orifice for cooperating with the third notch; the holder further has a first tilted cutout formed adjacent to the second notch and a second tilted cutout arranged proximate to the third notch; the pressing member also has a first tilted aperture for matching with the first tilted cutout and a second tilted aperture for mating with the second tilted cutout; the main gear has a square hole defined on a central portion thereof so as to insert the rotary shaft, the left gear has a first square recess formed on a central portion of a bottom end thereof so as to insert the first transmission column, and the right gear has a second square recess formed on a central portion of a bottom end thereof so as to insert the second transmission column, such that two ends of the main gear are inserted into the first notch of the holder and the first orifice of the pressing member, two ends of the left gear are inserted into the second notch of the holder and the second orifice of the pressing member, and the two ends of the right gear are inserted into the third notch of the holder and the third orifice of the pressing member, two ends of the first transmission gear are received in the first tilted cutout of the holder and the first tilted aperture of the pressing member, and two ends of the second transmission gear are received in the second tilted cutout of the holder and the second tilted aperture of the pressing member, hence after the pressing member is connected with the holder, the rotary shaft is inserted into the square hole of the main gear so as to form the transmitting mechanism;

the first transmission column and the second transmission column of the grinding mechanism are inserted into the first square recess of the left gear and the second square recess of the right gear through the first hole and the second hole of the holder, and a top end of the rotary shaft is inserted into the square trench of the inner cover, the inner cover is retained with the holder, and the outer cover is fitted with the inner cover.

2. The dual condiment grinder as claimed in claim 1, wherein the main gear does not mesh with the left gear and the right gear, the first transmission gear does not mesh with the second transmission gear, and the first transmission gear and the second transmission gear mesh with the main gear respectively, such that when the covering assembly rotates in a clockwise direction, the main gear drives the first transmission gear and the second transmission gear to move leftward so that the first transmission gear matches with the left gear so as to drive the left gear and the first transmission column to grind; when the covering assembly rotates in a counterclockwise direction, the main gear drives the first transmission gear and the second transmission gear to move rightward so that the second transmission gear matches with the right gear so as to drive the right gear and the second transmission column to grind.

* * * * *